(12) United States Patent
Yan et al.

(10) Patent No.: US 12,510,803 B2
(45) Date of Patent: Dec. 30, 2025

(54) OPTICAL IMAGE STABILIZATION COMPONENT AND CAMERA MODULE

(71) Applicant: Changzhou AAC Raytech Optronics Co., Ltd., Changzhou (CN)

(72) Inventors: Feng Yan, Shenzhen (CN); Junxiang Han, Shenzhen (CN); Suohe Wei, Shenzhen (CN)

(73) Assignee: Changzhou AAC Raytech Optronics Co., Ltd., Changzhou (CN)

( * ) Notice: Subject to any disclaimer, the term of this patent is extended or adjusted under 35 U.S.C. 154(b) by 786 days.

(21) Appl. No.: 17/841,592

(22) Filed: Jun. 15, 2022

(65) Prior Publication Data

US 2023/0314905 A1 Oct. 5, 2023

(30) Foreign Application Priority Data

Mar. 30, 2022 (CN) .......................... 202220720676.8

(51) Int. Cl.
*G03B 5/04* (2021.01)
*G02B 27/64* (2006.01)
*H04N 23/68* (2023.01)

(52) U.S. Cl.
CPC ............. *G03B 5/04* (2013.01); *G02B 27/646* (2013.01); *H04N 23/687* (2023.01); *G03B 2205/0015* (2013.01); *G03B 2205/0069* (2013.01)

(58) Field of Classification Search
USPC ...................................................... 396/52, 55
See application file for complete search history.

(56) References Cited

U.S. PATENT DOCUMENTS

| | | | | | |
|---|---|---|---|---|---|
| 4,120,489 | A | * | 10/1978 | Borlinghaus | ............. F16F 1/08 267/166.1 |
| 2022/0285064 | A1 | * | 9/2022 | Lee | ................... H04N 23/6812 |

* cited by examiner

*Primary Examiner* — Phu Vu
(74) *Attorney, Agent, or Firm* — Wiersch Law Group

(57) ABSTRACT

The present disclosure provides an optical image stabilization component, which includes a base, a suspension mechanism, a carrier, a drive mechanism, and a casing, where the suspension mechanism includes an elastic sheet connected to the carrier and a spring wire. The spring wire is formed by sequentially connecting multiple spiral bending portions in a nose to tail manner, and an outer diameter of each of the multiple spiral bending portions gradually decreases from a middle of the spring wire to two ends of the spring wire. The optical image stabilization component of the present disclosure occupies a smaller space, the drive performance in each direction is closer, the stress distribution is more uniform, and the reliability is higher. There are wider application scenarios in the background that the weight of the lens increases presently.

16 Claims, 7 Drawing Sheets

OPTICAL IMAGE STABILIZATION COMPONENT AND CAMERA MODULE

TECHNICAL FIELD

The present disclosure relates to the technical filed of optical image stabilization, in particular to an optical image stabilization component and a camera module.

BACKGROUND

By introducing an optical image stabilization component into a camera module of an electronic product, the vibration of an instrument in a process of capturing an optical signal can be effectively avoided or reduced, thereby improving the imaging quality. A suspension mechanism in the optical image stabilization component in the conventional art generally adopts a cylindrical metal suspension wire or an elastic sheet, which has poor reliability and is less feasible to be applied to an optical image stabilization component of a high pixel lens.

Therefore, it is necessary to provide a new optical image stabilization component to solve the above technical problems.

SUMMARY

An objective of the present disclosure is to provide an optical image stabilization component with desirable reliability and high strength, which can be applied to carry heavier lenses.

The technical solutions of the present disclosure are as follows. An optical image stabilization component is provided according to the present disclosure, and the optical image stabilization component includes a base, a suspension mechanism fixed on the base, a carrier suspended on the base by the suspension mechanism and configured to move relative to the base, a drive mechanism arranged on the base and configured to drive the carrier to move, and a casing covering the base and the carrier, where the suspension mechanism includes an elastic sheet connected to the carrier and a spring wire, one end of the spring wire is connected to the elastic sheet, and the other end of the spring wire is connected to the base. The spring wire is formed by sequentially connecting multiple helical bending portions in a nose to tail manner, and an outer diameter of each of the multiple spiral bending portions gradually decreases from a middle of the spring wire to two ends of the spring wire.

As an improvement, a wire diameter of each of the multiple helical bending portions gradually decreases from the middle of the spring wire to the two ends of the spring wire.

As an improvement, a first groove is defined at a junction of the base and the spring wire, a diameter of an opening of the first groove is larger than a diameter of a bottom of the first groove, and an end of the spring wire is connected to the bottom of the first groove.

As an improvement, the elastic sheet is fixed on a side of the carrier away from the base, and a second groove is defined at a side of the carrier close to the base; an opening in communication with the second groove is opened on the carrier, and the spring wire passes through the second groove and the opening to be fixedly connected to the elastic sheet.

As an improvement, an inner diameter of the opening gradually increases along a direction close to the base, and the opening is matched with an end of the spring wire close to the elastic sheet.

As an improvement, an inner wall of an end of the second groove close to the opening is an inclined surface, and an inner diameter of the end of the second groove close to the opening decreases toward the opening.

As an improvement, both of the base and the carrier are a square structure, and the spring wire is arranged at four corners of the base.

As an improvement, the carrier includes a carrier body configured to carry a lens and a bracket sleeved on a periphery of the carrier body, the elastic sheet is fixedly connected between the carrier body and the bracket, and the spring wire is fixedly connected between the bracket and the base.

As an improvement, the drive mechanism includes a circuit board mounted on a side of the base close to the casing, a drive coil fixedly mounted on a side of the circuit board away from the base, a drive magnetic steel fixedly mounted on the bracket and arranged corresponding to the drive coil, and an image stabilization coil sleeved on the carrier body and located between the carrier and the bracket.

A camera module is further provided according to the present disclosure, and the camera module includes the above optical image stabilization component and a lens arranged in the carrier.

The beneficial effects of the present disclosure are as follows. A spatial metal suspension wire with a gradually varied outer diameter design is adopted to replace the conventional suspension wire scheme, in which an upper elastic sheet is adopted to absorb shock (the elastic sheet in the present disclosure provides only electricity conduction). The structural reliability is ensured by the deformation of the spring wire itself when the optical image stabilization component drops, the drive performances in all directions are closer to each other, the stress distribution is more uniform, the reliability and strength are higher, which can meet the relevant structural performance requirements, so that there are wider application scenarios in the background that the weight of the lens increases presently.

DETAILED DESCRIPTION

The present disclosure will be further described below with reference to the accompanying drawings and embodiments.

Figure 1:
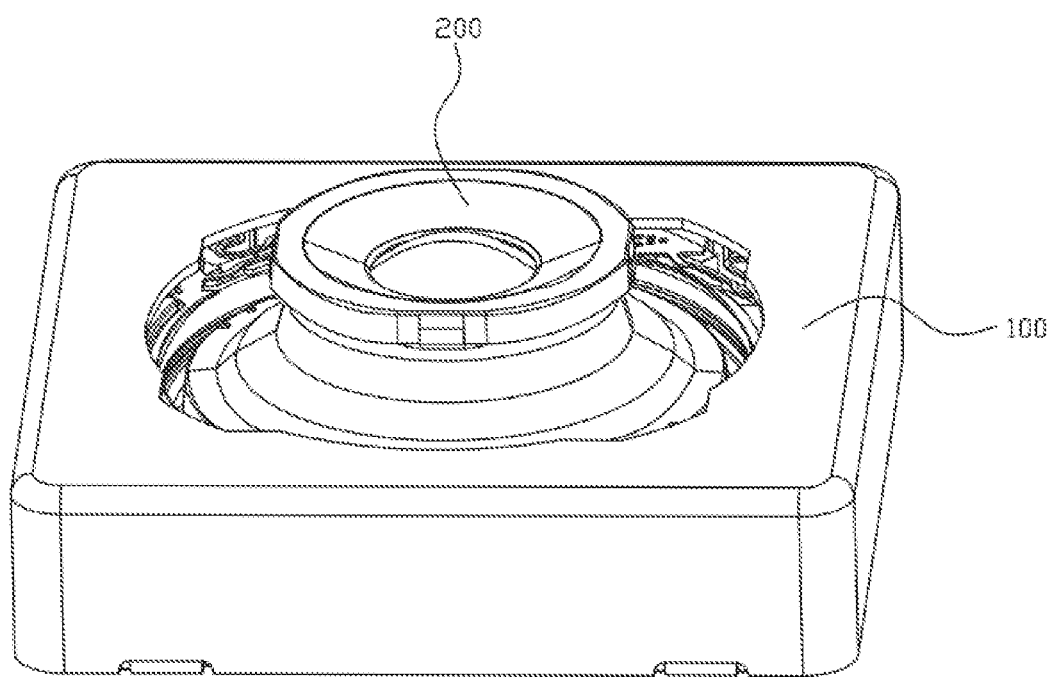
FIG. 1 is a schematic structural view of a camera module provided according to an embodiment of the present disclosure.

Reference is made to FIG. 1, which is a schematic structural view of a camera module provided according to an embodiment of the present disclosure. The camera module includes an optical image stabilization component 100 and a lens 200, where the lens 200 is mounted on the optical image stabilization component 100, and is driven by the optical image stabilization component 100 to move, so as to realize the image stabilization of the camera module.

Figure 3:
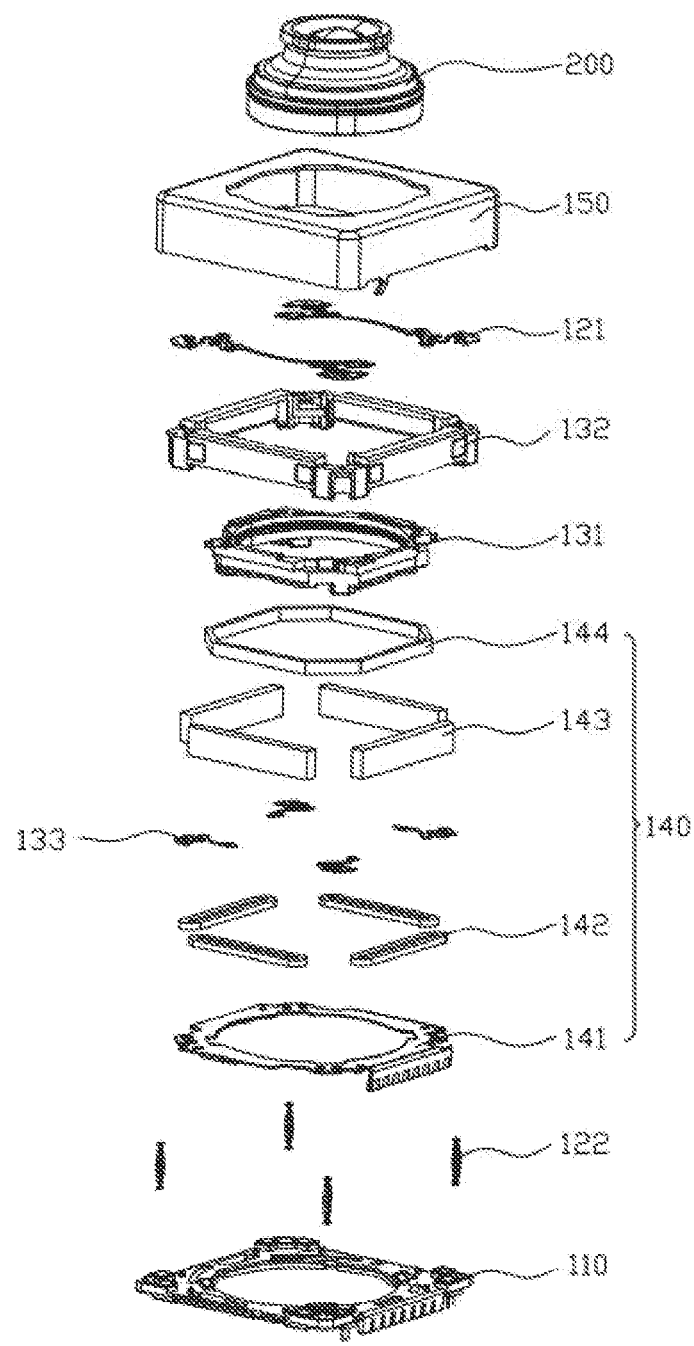
FIG. 3 is a schematic three-dimensional explosive structural view of a camera module provided according to an embodiment of the present disclosure.

As shown in FIG. 3, the optical image stabilization component 100 includes a base 110, a suspension mechanism 120, a carrier 130, a drive mechanism 140 and a casing 150. The suspension mechanism 120 is fixed on the base 110. The carrier 130 is suspended on the base 110 by the suspension mechanism 120, and is configured to move relative to the base 110. The carrier 130 is configured to carry the lens 200 and drive the lens 200 to move synchronously. The drive mechanism 140 is arranged on the base 110 and is located around the carrier 130 to drive the carrier 130 to move. The casing 150 covers the base 110 and the carrier 130, so that the carrier 130 moves between the base 110 and the casing 150.

Figure 2:
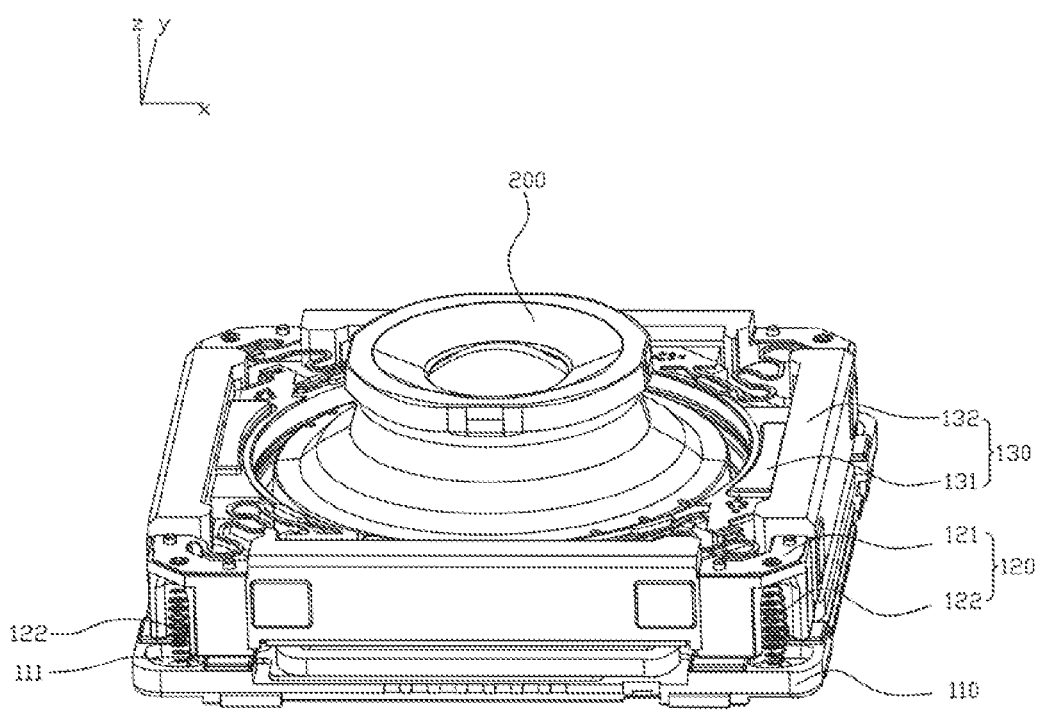
FIG. 2 is a schematic structural view of a camera module with a casing removed provided according to an embodiment of the present disclosure.
Figure 4:
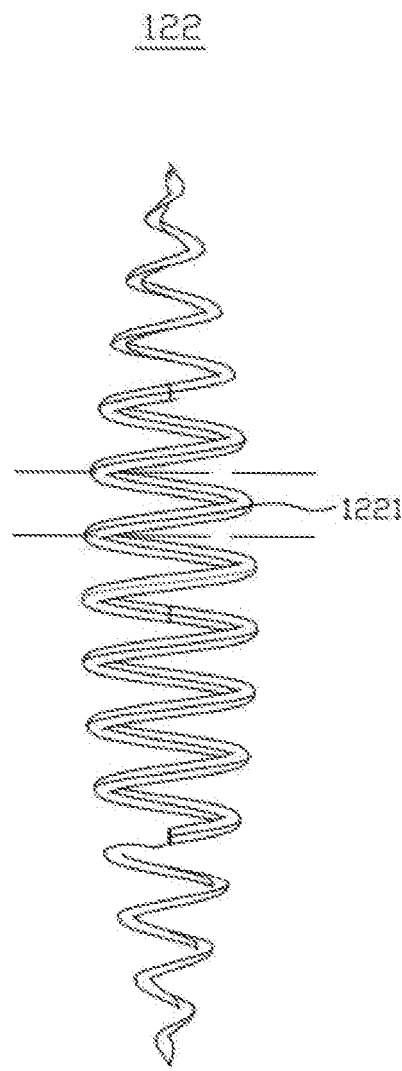
FIG. 4 is a schematic structural view of a spring wire provided according to an embodiment of the present disclosure.

Combining FIG. 2 and FIG. 4, the suspension mechanism 120 includes an elastic sheet 121 and a spring wire 122, the elastic sheet 121 is connected to the carrier 130, one end of the spring wire 122 is connected to the elastic sheet 121 to achieve electrical conduction, and the other end of the spring wire 122 is connected to the base 110, which can pass through the base 110 to achieve electrical conduction with inserts integrated inside the base 110 and leads to external terminals. The elastic sheet 121 of the present disclosure is only configured to realize the electrical conduction, and the reliability of the carrier 130 during movement depends on the deformation of the spring wire 122 with a special structure itself. The specific structure of the spring wire 122 is as follows. Multiple spiral bending portions 1221 are sequentially connected in a nose to tail manner, and an outer diameter of each of the multiple spiral bending portions 1221 gradually decreases from the middle of the spring wire 122 to both two ends of the spring wire 122. Each of the multiple spiral bending portions 1221 can be spiral for one whole circle or less than one whole circle, as long as the multiple spiral bending portions 1221 are connected in the nose to tail manner to form a spring-like structure. Each of the multiple spiral bending portions 1221 being spiral for one whole circle is taken as an example, a distance corresponding to each of the multiple spiral bending portions 1221 of a conventional spring is equal to a spiral pitch, while a distance of each of the multiple spiral bending portions 1221 in this embodiment is greater than the spiral pitch.

A spatial metal suspension wire with a gradually varied outer diameter design is adopted in the present disclosure to replace the conventional suspension wire, so that the structural form at both ends of the spring wire 122 is optimized, the length of the suspension wire is effectively extended, the design space is improved, and the product performance and reliability under the premise of ensuring structural assembly and performance are improved. By reducing outer width of the two ends of the spring wire 122, it is beneficial to adjust the axial stiffness, so as to improve the disadvantage that the axial stiffness of the ordinary spring cannot meet the requirements, while improving the deformation uniformity and stress performance of the spring wire 122 at each position when it is pulled. The spring wire 122 is not easy to be twisted in one direction, so that the overall reliability is higher and the impact resistance is stronger. Moreover, the gradually varied outer width design increases gaps between each of the multiple spiral bending portions 1221, so that the deformation safety space is enhanced, self-interference is avoided, and the reliability is further enhanced. Compared with the plane elastic sheet or the conventional suspension wire structure, the design of the spiral spring barely has directional difference, the linear relationship between the theoretical current of a motor and the stroke of the motor is better, and the linearity level is higher. At the same time, forced shapes of the spring wire 122 in all directions are close to the same, so that the X/Y directional interference is theoretically smaller.

In a preferred embodiment, the wire diameter of each of the multiple spiral bending portions 1221 gradually decreases from the middle of the spring wire 122 to both two ends of the spring wire 122. By further optimizing the structural design, better effects of stress distribution and reliability of the spring wire 122 are achieved.

Referring to FIG. 2, the carrier 130 includes a carrier body 131 and a bracket 132. The carrier body 131 is configured to mount the lens 200, and the bracket 132 is sleeved on the periphery of the carrier body 131. The elastic sheet 121 is fixedly connected between the carrier body 131 and the bracket 132, and the elastic sheet 121 is located at a side of the carrier 130 away from the base 110. An end of the spring wire 122 away from the base 110 passes through the bracket 132, and is connected to the elastic sheet 121. In order to make the connection between the carrier body 131 and the bracket 132 more stable, as shown in FIG. 3, the carrier 130 further includes an elastic arm 133, which is fixedly connected between a side of the carrier body 131 close to the base 110 and a side of the bracket 132 close to the base 110.

Figure 5:
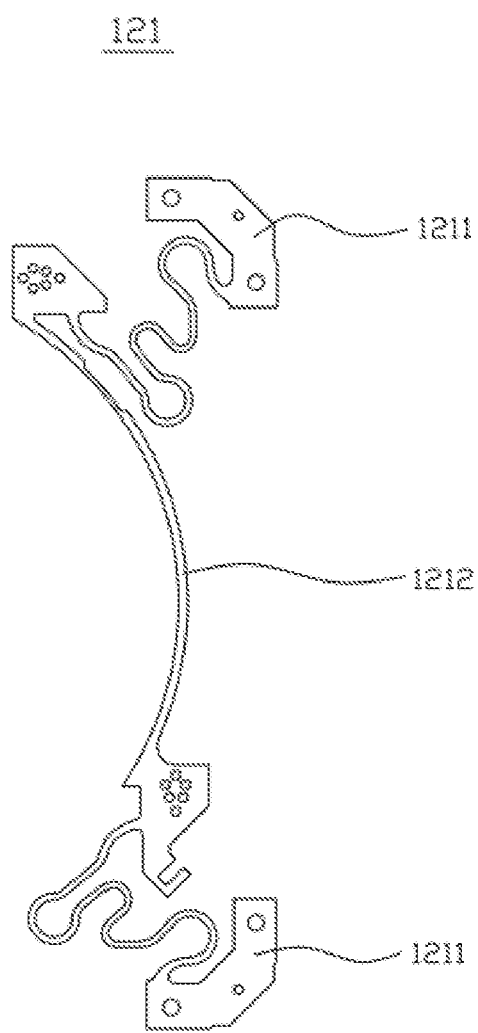
FIG. 5 is a schematic structural view of an elastic sheet provided according to an embodiment of the present disclosure.

Both the base 110 and the carrier 130 may be a square structure with a circular through hole inside, and four of the spring wires 122 and four of the elastic arms 133 are provided, which are respectively located on four corners of the square structure. As shown in FIG. 5, the elastic sheet 121 includes two zigzag portions 1211 with irregular shapes located at two ends of the elastic sheet 121 and a connecting beam 1212 connected between the two zigzag portions 1211. Two of the elastic sheets 121 are symmetrically arranged on the carrier 130. With this structure, the elastic sheets 121 have more degrees of freedom and better elastic effect in a direction perpendicular to an optical axis.

Figure 6:
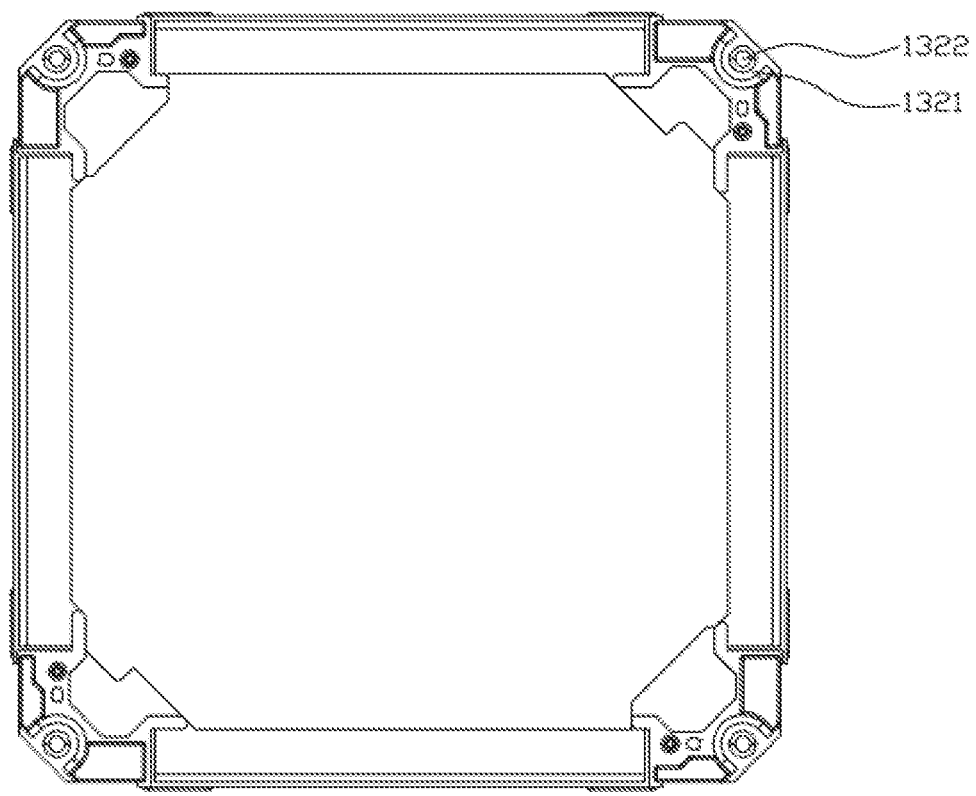
FIG. 6 is a bottom view of a bracket provided according to an embodiment of the present disclosure.
Figure 7:
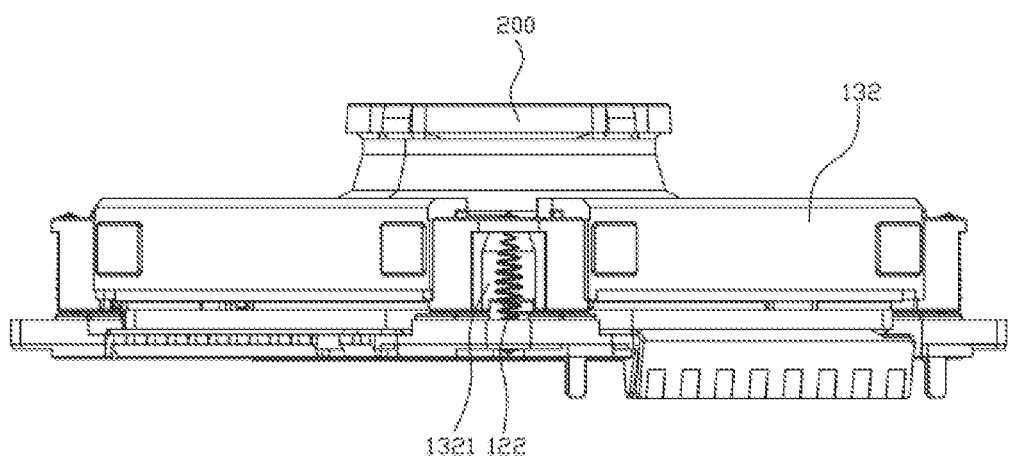
FIG. 7 is an axonometric view of a camera module with a casing removed provided according to an embodiment of the present disclosure.

Combining FIG. 2, FIG. 6 and FIG. 7, due to the special structure of the spring wire 122 of the present disclosure, the base 110 and the bracket 132 are also designed accordingly. A first groove 111 is defined on a junction of the base 110 and the spring wire 122. A diameter of an opening of the first groove 111 is larger than a diameter of a bottom of the first groove, and one end of the spring wire 122 is connected to the bottom of the first groove 111. A second groove 1321 is defined at the side of the bracket 132 close to the base 110. An opening 1322 in communication with the second groove 1321 is opened on the carrier 130, and the spring wire 122 passes through the second groove 1321 and the opening 1322 to be fixedly connected to the zigzag portion 1211. Preferably, an inner diameter of the opening 1322 gradually increases in the direction close to the base 110, and the opening 1322 is matched with the end of the spring wire 122 close to the elastic sheet 121. The structural design of the first groove 111 and the opening 1322 effectively extends the length of a functional section of the spring wire 122. At the same time, compared with the plane elastic sheet or the conventional suspension wire structure, the structural design of the spring wire 122 of the present disclosure makes the avoidance space at the four corners of the bracket 132 smaller, which can be used to increase the area of a dropping position-limiting surface (protection surface), thereby improving the reliability of product. In a preferred embodiment, an inner wall of an end of the second groove 1321 close to the opening 1322 is an inclined surface, and an inner diameter of the end of the second groove 1321 close to the opening 1322 decreases toward the opening 1322. Compared with a straight groove, the second groove 1321 saves space, which can be used to arrange reinforcing ribs in the plastic structure, so that the space utilization rate is higher, it is conducive to improve the structural strength of parts on the peripheral of the inclined surface.

Referring to FIG. 3, the drive mechanism 140 includes a circuit board 141, a drive coil 142, a drive magnetic steel 143 and an image stabilization coil 144. The circuit board 141 is mounted on a side of the base 110 close to the casing 150, and is provided with a control circuit of the optical image stabilization component 100. The circuit board 141 may be embodied as a flexible circuit board. The drive coil 142 is fixedly mounted on a side of the circuit board 141 away from the base 110, the drive magnetic steel 143 is fixedly mounted on the bracket 132. The drive coil 142 and the drive magnetic steel 143 are of the same number and arranged correspondingly. The image stabilization coil 144 is sleeved on the carrier body and located between the carrier 130 and the bracket 132. For the optical image stabilization component 100 with a square structure, four of the drive coils 142 and four of the drive magnetic steels 143 are provided, the four drive coils 142 correspond to the four drive magnetic steels 143, respectively, and the four drive coils 142 can be independently energized to control the current.

Preferably, the four drive coils 142 and the four drive magnetic steels 143 are axially symmetrical about the center axis of the carrier 130 or the base 110. In response to introducing currents with different magnitudes into the two oppositely arranged drive coils 142, the corresponding drive magnetic steels 143 can be driven to drive the bracket 132 to incline, so that the rotation angle can be compensated. The cooperation of the drive magnetic steels 143 and the drive coils 142 can drive the carrier 130 to rotate and tilt around the X axis, or Y axis.

The image stabilization coil 144 is fixedly sleeved on the carrier body 131, and the four drive magnetic steels 143 uniformly distributed in the circumferential direction of the image stabilization coil 144 to cooperate with the image stabilization coil 144 to drive the carrier 130 to move in the horizontal plane perpendicular to the optical axis. That is, the carrier 130 can move in the X-axis and Y-axis direction, which reduces the offset of the carrier 130 in the non-optical axis direction, thereby realizing the image stabilization of the optical image stabilization component 100.

The working principle of the optical image stabilization component 100 in the present disclosure is as follows. In response to introducing currents with different magnitudes into the two oppositely arranged drive coils 142 in the X-axis direction, the carrier 130 can tilt around the Y-axis direction. Similarly, in response to introducing currents with different magnitudes into the two oppositely arranged drive coils 142 in the Y-axis direction, the carrier 130 can tilt around the X-axis direction. The tilt compensation of the optical image stabilization can be realized by controlling the magnitude of the current. In response to energizing the image stabilization coil 144, electromagnetic induction will be generated between the drive magnetic steel 143 and the image stabilization coil 144, and the carrier 130 will move in a horizontal direction perpendicular to the optical axis under the action of the electromagnetic induction.

The above are only the embodiments of the present disclosure. It should be pointed out that for those of ordinary skill in the art, improvements may be made without departing from the inventive concept of the present disclosure, and the improvements shall fall within but the scope of protection of the present disclosure.

The invention claimed is:

1. An optical image stabilization component, comprising a base, a suspension mechanism fixed on the base, a carrier suspended on the base by the suspension mechanism and configured to move relative to the base, a drive mechanism arranged on the base and configured to drive the carrier to move, and a casing covering the base and the carrier, wherein the suspension mechanism comprises an elastic sheet connected to the carrier and a spring wire, one end of the spring wire is connected to the elastic sheet, and the other end of the spring wire is connected to the base; the spring wire is formed by sequentially connecting a plurality of helical bending portions in a nose to tail manner, and an outer diameter of each of the plurality of spiral bending portions gradually decreases from a middle of the spring wire to two ends of the spring wire;

wherein a first groove is defined at a function of the base and the spring wire, a diameter of an opening of the first groove is larger than a diameter of a bottom of the first groove, and an end of the spring wire is connected to the bottom of the first groove.

2. The optical image stabilization component according to claim 1, wherein a wire diameter of each of the plurality of helical bending portions gradually decreases from the middle of the spring wire to the two ends of the spring wire.

3. The optical image stabilization component according to claim 1, wherein the elastic sheet is fixed on a side of the carrier away from the base, and a second groove is defined at a side of the carrier close to the base; an opening in communication with the second groove is opened on the carrier, and the spring wire passes through the second groove and the opening to be fixedly connected to the elastic sheet.

4. The optical image stabilization component according to claim 3, wherein an inner diameter of the opening gradually increases along a direction close to the base, and the opening is matched with an end of the spring wire close to the elastic sheet.

5. The optical image stabilization component according to claim 3, wherein an inner wall of an end of the second groove close to the opening is an inclined surface, and an inner diameter of the end of the second groove close to the opening decreases toward the opening.

6. The optical image stabilization component according to claim 1, wherein both of the base and the carrier are a square structure, and the spring wire is arranged at four corners of the base.

7. The optical image stabilization component according to claim 2, wherein both of the base and the carrier are a square structure, and the spring wire is arranged at four corners of the base.

8. The optical image stabilization component according to claim 1, wherein both of the base and the carrier are a square structure, and the spring wire is arranged at four corners of the base.

9. The optical image stabilization component according to claim 3, wherein both of the base and the carrier are a square structure, and the spring wire is arranged at four corners of the base.

10. The optical image stabilization component according to claim 4, wherein both of the base and the carrier are a square structure, and the spring wire is arranged at four corners of the base.

11. The optical image stabilization component according to claim 5, wherein both of the base and the carrier are a square structure, and the spring wire is arranged at four corners of the base.

12. The optical image stabilization component according to claim 1, wherein the carrier comprises a carrier body configured to carry a lens and a bracket sleeved on a periphery of the carrier body, the elastic sheet is fixedly connected between the carrier body and the bracket, and the spring wire is fixedly connected between the bracket and the base.

13. The optical image stabilization component according to claim 12, wherein the carrier 130 further comprises an elastic arm fixedly connected between a side of the carrier body close to the base and a side of the bracket close to the base.

14. The optical image stabilization component according to claim 12, wherein the elastic sheet comprises two zigzag portions with irregular shapes located at two ends of the elastic sheet, and a connecting beam connected between the two zigzag portions.

15. The optical image stabilization component according to claim 12, wherein the drive mechanism comprises a circuit board mounted on a side of the base close to the casing, a drive coil fixedly mounted on a side of the circuit board away from the base, a drive magnetic steel fixedly mounted on the bracket and arranged corresponding to the drive coil, and an image stabilization coil sleeved on the carrier body and located between the carrier and the bracket.

16. A camera module, comprising the optical image stabilization component according to claim 1 and a lens arranged in the carrier.

\* \* \* \* \*